US006876649B1

United States Patent
Beshai

(10) Patent No.: US 6,876,649 B1
(45) Date of Patent: Apr. 5, 2005

(54) HIGH-CAPACITY WDM-TDM PACKET SWITCH

(75) Inventor: Maged E. Beshai, Stittsville (CA)

(73) Assignee: Nortel Networks Limited (CA)

(*) Notice: Subject to any disclaimer, the term of this patent is extended or adjusted under 35 U.S.C. 154(b) by 0 days.

(21) Appl. No.: 09/550,489

(22) Filed: Apr. 17, 2000

(30) Foreign Application Priority Data

Sep. 27, 1999 (CA) .............................................. 2283627

(51) Int. Cl.[7] .............................................. H04Q 11/00
(52) U.S. Cl. ...................................... 370/355; 370/380
(58) Field of Search ................................. 370/352, 355, 370/360, 375, 380, 386, 388, 230, 231, 232, 389, 392, 412, 413, 465, 468, 498

(56) References Cited

U.S. PATENT DOCUMENTS

| | | | |
|---|---|---|---|
| 5,091,905 A | | 2/1992 | Amada .......................... 370/60 |
| 5,168,492 A | * | 12/1992 | Beshai et al. ................. 370/353 |
| 5,367,518 A | * | 11/1994 | Newman ..................... 370/414 |
| 5,528,406 A | | 6/1996 | Jeffrey et al. ................. 359/128 |
| 5,905,725 A | | 5/1999 | Sindhu et al. ................ 370/389 |
| 6,385,198 B1 | * | 5/2002 | Ofek et al. ................... 370/389 |
| 6,563,837 B2 | * | 5/2003 | Krishna et al. .............. 370/413 |

FOREIGN PATENT DOCUMENTS

WO  WO 97/16004  10/1996  ........... H04L/12/56

OTHER PUBLICATIONS

Beshai et al. "Multi–Tera–bit/S Switch Based on Burst Transfer and Independent Shared Buffers". IEEE. Nov. 13–17, 1995. pp. 1724–1730.*

Limal et al. "Considerations on optical wavelength multiplexing versus optical time multiplexing in transpart network". IEEE. Feb. 21–26, 1999. pp. 359–361.*

Yuan et al. "Distributed Path Reservation Algorithms for Multiplexed All–Optical Interconnection Networks". IEEE. Feb. 1–5, 1997. pp. 38–47.*

* cited by examiner

*Primary Examiner*—Chi Pham
*Assistant Examiner*—Derrick W Ferris
(74) *Attorney, Agent, or Firm*—Steubing McGuiness & Manaras LLP

(57) ABSTRACT

A self-configuring distributed packet switch which operates in wavelength division multiplexed (WDM) and time division multiplexed (TDM) modes is described. The switch comprises a distributed channel switching core, the core modules being respectively connected by a plurality of channels to a plurality of high-capacity packet switch edge modules. Each core module operates independently to schedule paths between edge modules, and reconfigures the paths in response to dynamic changes in data traffic loads reported by the edge modules. Reconfiguration timing between the packet switch modules and the channel switch core modules is performed to keep reconfiguration guard time minimized. The advantage is a high-capacity, load-adaptive, self-configuring switch that can be distributed to serve a large geographical area and can be scaled to hundreds of Tera bits per second to support applications that require, very high bandwidth and a guaranteed quality of service.

53 Claims, 9 Drawing Sheets

| | 0 | 1 | 2 | 3 | 4 | 5 | 6 | 7 | 8 | 9 | 10 | 11 | 12 | 13 | 14 | 15 | ← 40 |
|---|---|---|---|---|---|---|---|---|---|---|---|---|---|---|---|---|---|
| Σ | 5 | 4 | 8 | 5 | 12 | 9 | 8 | | 8 | 11 | 12 | 7 | 12 | 7 | 10 | 4 | |
| | 0 | 1 | 2 | 3 | 1 | 1 | 2 | | 2 | 2 | 2 | 0 | 3 | 0 | 0 | 3 | ← 42 |
| | 3 | 2 | 1 | 0 | 0 | 2 | 1 | | 1 | 1 | 3 | 1 | 2 | 3 | 3 | 2 | |
| | 1 | 0 | 0 | 2 | 2 | 0 | 3 | | 0 | 3 | 1 | 3 | 0 | 1 | 2 | 0 | |
| | 2 | 3 | 3 | 1 | 3 | 3 | 0 | | 3 | 0 | 0 | 2 | 1 | 2 | 1 | 1 | |

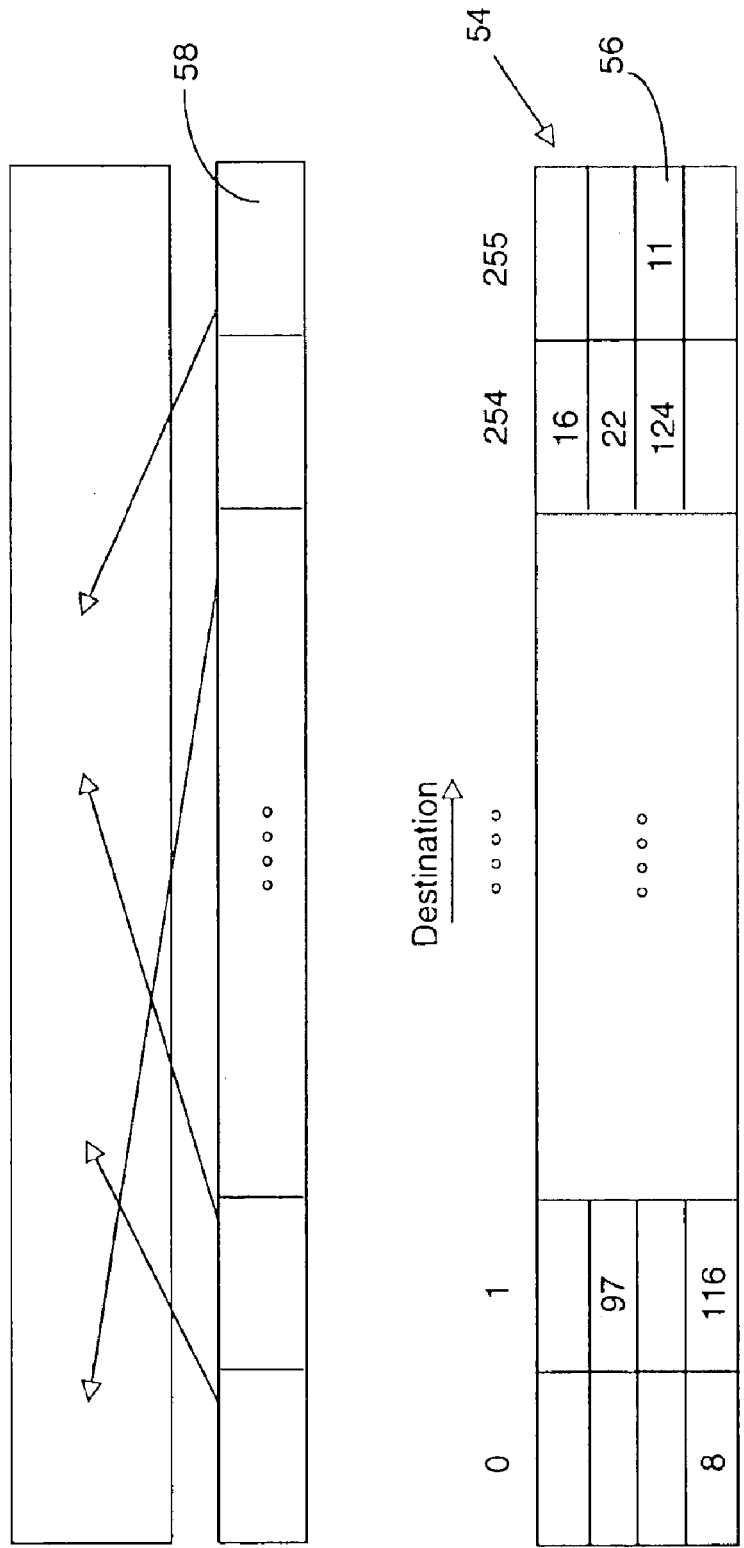

HIGH-CAPACITY WDM-TDM PACKET SWITCH

STATEMENT REGARDING FEDERALLY SPONSORED RESEARCH OR DEVELOPMENT

This work was supported by the United States Government under Technology Investment Agreement TIA F30602-98-2-0194.

TECHNICAL FIELD

This invention relates generally to the field of data packet switching and, in particular, to a distributed very high-capacity switch having edge modules that operate in packet switching mode and core modules that operate in circuit switching mode, the core modules switching payload traffic between the edge modules using wavelength division multiplexing (WDM) and time division multiplexing (TDM).

BACKGROUND OF THE INVENTION

Introduction of the Internet to the general public and the exponential increase in its use has focused attention on high speed backbone networks and switches capable of delivering large volumes of data at very high rates. In addition to the demand for higher transfer rates, many service applications are being developed, or are contemplated, which require guaranteed grade of service and data delivery at guaranteed quality of service. To date, efforts to grow the capacity of the Internet have largely been focused on expanding the capacity and improving the performance of legacy network structures and protocols. Many of the legacy network structures are, however, difficult to scale into very high-capacity networks. In addition, many legacy network protocols do not provide grade of service or quality of service guarantees.

Nonetheless, high capacity switches are known in the prior art. Prior art high capacity switches are commonly constructed as a multi-stage, usually three stage, architecture in which ingress modules communicate with egress modules through a switch core stage. The transfer of data from the ingress modules to the egress modules must be carefully coordinated to prevent contention and to maximize the throughput of the switch. Within the switch, the control may be distributed or centralized. A centralized controller must receive traffic state information from each of the ingress modules. Each ingress module reports the volume of waiting traffic destined to each of the egress modules. The centralized controller therefore receives traffic information related to traffic volume from each of the ingress modules. If, in addition, the controller is made aware of the class of service distinctions among the waiting traffic, the amount of traffic information increases proportionately. Increasing the amount of traffic information increases the number of control variables and results in increasing the computational effort required to allocate the ingress/egress capacity and to schedule its usage. Consequently, it is desirable to keep the centralized controller unaware of the class of service distinctions while providing a means of taking the class of service distinctions into account during the ingress/egress transfer control process.

This is accomplished in a rate-controlled multi-class high-capacity packet switch described in Applicant's copending U.S. patent application Ser. No. 09/244,824 which was filed on Feb. 4, 1999. Although the switch described in this patent application is adapted to switch variable sized packets at very high speeds while providing grade-of-service and quality-of-service control, there still exists a need for a distributed switch that can form the core of a powerful high-capacity, high-performance network that is adapted to provide wide geographical coverage with end-to-end capacity that scales to hundreds of Tera bits per second (Tbs), while providing grade of service and quality of service controls.

A further challenge in providing a powerful high-capacity: high-performance switch with wide geographical coverage is maintaining network efficiency in the face of constantly fluctuating traffic volumes. In response to this challenge, the Applicant also invented a self-configuring data switch comprising a number of electronic switching modules interconnected by a single-stage channel switch that includes a number parallel space switches, each having input ports and output ports. This switch architecture is described in Applicant's copending United States patent application entitled SELF-CONFIGURING DISTRIBUTED SWITCH which was filed on Apr. 6, 1999 and assigned application Ser. No. 09/286,431. Each of the electronic modules is capable of switching variable-sized packets and is connected to the set of parallel space switches by a number of optical channels, each of the optical channels being a single wavelength in a multiple wavelength fiber link. The channel switching core permits any two modules to be connected by an integer number of channels. In order to enable the switching of traffic at arbitrary transfer rates, the inter-module connection pattern is changed in response to fluctuations in data traffic load. However, given the speed of optical switching equipment and the granularity of the channels, it is not always possible to adaptively modify the paths between modules to accommodate all data traffic variations. Consequently, it sometimes proves uneconomical to establish under-utilized paths for node pairs with low traffic volumes. To overcome this difficulty, a portion of the data traffic flowing between a source module and a sink module is switched through one or more intermediate nodes. Thus, in effect, the switch functions as a hybrid of a channel switch and linked buffer data switch, benefiting from the elastic path capacity of the channel switch.

A concentration of switching capacity in one location is, however, undesirable for reasons of security and economics. Consequently, it is desirable to provide a high-capacity switch with a distributed core. Such a core has the advantages of being less vulnerable to destruction in the event of a natural disaster, for example. It is also more economical because strategic placement of distributed core modules reduces link lengths and provides shorter paths for localized data traffic.

There therefore exists a need for a very high-capacity packet switch with a distributed core that is adapted to provide grade of service and quality of service guarantees. There also exists a need for a very high-capacity packet switch that provides intra-switch data paths of a finer granularity to reduce or eliminate a requirement for tandem switching.

SUMMARY OF THE INVENTION

A very high-capacity packet switch is adapted to provide a high service-quality, as well as providing intra-switch data paths with a fine granularity that reduces or eliminates a requirement for tandem switching. The packet switch requires a scheduler to coordinate the transfer of packets across the switch, and the scalability of the switch is primarily determined by the throughput of its scheduler. Providing a fide granularity in a high-capacity switch requires an extensive scheduling effort that may not be realizable with a single controller. The invention, therefore, provides a switch that includes a plurality of core modules that operate in a time-division mode, and a plurality of edge modules that are connected to subtending packet sources and sinks, with each core module having its own controller which includes a packet-transfer scheduler.

In accordance with an aspect of the present invention, there is provided a packet switch. The packet switch comprises a plurality of independently-controlled core modules, a plurality of ingress modules, and a plurality of egress modules. The packet switch may further include a plurality of core controllers operating concurrently and independently; one core controller associated with each of the independently-controlled core modules and having a packet scheduler. B-ach ingress module receives packets from subtending packet sources and has a link directed to each of the core modules. Each egress module has a link from each of the core modules and transmits packets to subtending packet sinks. Bach of the ingress modules is operable to issue packet-transfer requests and distribute the packet-transfer requests among the core modules for scheduling. Each core module computes schedules in response to receiving packet-transfer requests, the schedules specifying time slots in a predefined time frame for each request. The ingress modules and the core modules can be geographically distributed and each ingress module is provided with a plurality of timing circuits each communicating with a time counter associated with one of the core modules to realize time coordination between each ingress module and the core modules.

In accordance with another aspect of the present invention, there is provided a method of scheduling. The method is performed by a controller of a core module having $S \geq 1$ space switches and at least one link to each of a plurality of ingress modules, where each ingress module formulates capacity-allocation requests preferably organized in capacity-request vectors each entry of which specifying an input port p, an output port $\pi$, and a number K of time slots per time frame. The method relies on a data structure to facilitate the scheduling process. The data structure preferably comprises a first three-dimensional matrix having a space dimension s representing space switches associated with the core module, a space dimension p representing space-switch input ports, and a time dimension t representing the time slots in a slotted frame, and a second three-dimensional matrix having the space dimension s, a space dimension $\pi$ representing space-switch output ports, and said time dimension t. The method comprises steps of creating the data structure, receiving capacity-allocation requests from the ingress edge modules, selecting a space switch s and a time slot t and, if both entries {s, p, t} of the first three-dimensional matrix and {s,$\pi$, t} of the second three-dimensional matrix are free, allocating the space switch s and the time slot t and marking entries {s, p, t} and {s,$\pi$, t} as busy. The step of selecting is repeated until at most K time slots are allocated. The method includes the further step of terminating a current connection by setting the value of K to equal to zero.

In accordance with a further aspect of the present invention, there is provided a distributed packet switch. The distributed packet switch comprises a plurality of m cross connectors, a plurality of n core modules, a plurality of m×n edge modules, and a plurality of n core controllers each having a core scheduler. Each cross connector has n outer links and n inner links. Each outer flak connects to an edge module and includes $\Lambda$ channels in each direction to and from the edge module. Each inner link connects to a core module and includes $\Lambda$ channels in each direction to and from the core module. Each core module comprises a number of space switches not exceeding the ratio $\Lambda$/n. The edge modules and the core modules can be spatially distributed over a wide geographical area and the outer and inner links are preferably wavelength-division-multiplexed links. Each edge module has means for time coordination with the core modules. The core controller of any core module is adapted to compute a schedule in response to receiving capacity-allocation requests, the schedule specifying, for each capacity-allocation request time slots in a predefined time frame.

In accordance with a still fiber aspect of the present invention, there is provided a packet switch. The packet switch comprises a plurality of egress modules, each for transmitting packets on at least one network link, a plurality of ingress modules, each for receiving packets from at least one network link and capable of requesting ingress-to-egress-module connections for transferring-received packets to any other of the egress modules, and a plurality of core modules, each capable of simultaneously receiving and independently responding to the ingress-to-egress-module connection requests from any of the ingress modules and of providing the ingress-to-egress module connections between any of the ingress modules and any of the egress modules in response to the connection requests. Each core module may have its own controller for allocating and scheduling resources to the ingress-to-egress-module connections. A core controller operates independently of, and concurrently with, the other core modules' controllers. Each edge module has a plurality of is ports each having an associated ingress buffer for receiving packets from subtending packet sources. An ingress controller in each ingress module sorts packets arriving in the ingress buffer into ingress queues, each ingress queue corresponding to an egress module from which packets are to egress from the switch for delivery to subtending packet sinks. Each edge module has a number of timing circuits at least equal to the number of core modules, each of the timing circuits being time-coordinated with a time counter associated with each of the core modules.

In accordance with an additional aspect of the present invention, there is provided a method of switching packets through a switch having a plurality of ingress modules each having at least one ingress port, a plurality of egress modules each having at least one egress port, and a plurality of core modules. Each ingress module is coupled to each core module, each care module is coupled to each egress module, and a packet can traverse only one ingress module, one core module, and one egress module in moving from an ingress port to an egress port. The method comprises steps of receiving, at an ingress module, packets from subtending traffic sources, the ingress module selecting the egress modules to which to send the packets, sending connection requests to selected core modules, and requesting connections of specified capacities. The method includes the further steps of determining a feasible capacity allocation in response to a connection request, subtracting the feasible capacity allocation from a specified capacity, and returning an updated connection request to the ingress module that issued the connection request. If the feasible capacity allocation is less than the specified capacity, the ingress module may send the connection request to another core module.

In accordance with another aspect of the present invention, there is provided an ingress module in a packet switch. The ingress module comprises an ingress controller, a plurality of ingress ports each having an ingress buffer for receiving packets from subtending packet sources where each packet indicates one of predefined destinations, a plurality of output ports for directing the packets to a plurality of core modules, means for sorting the packets received in the Ingress buffer into ingress queues each corresponding to one of the destinations, means for storing a set of predefined paths to each of the predefined destinations, means for formulating connection requests, each connection request specifying a destination and a required capacity allocation, and means for selecting a candidate path from among the predefined paths for each connection request.

In accordance with a further aspect of the present invention, there is provided a core module in a packet switch. The core module comprises at least one space switch having a plurality of input ports and a plurality of output ports, ad a core controller adapted to receive connection requests, each connection request specifying a required capacity allocation and a destination selected from among a set of predefined destinations. The core controller provides means for associating each destination with one of tic output ports, and a scheduler associated with the core controller times the transfer of packets from the input ports to the output port and communicates scheduling results to sources of the connection requests.

BRIEF DESCRIPTION OF THE DRAWINGS

The invention will now be explained by way of example only, and with reference to the following drawings, in which:

FIG. 6 is a schematic diagram of a table used by an ingress edge module to determine a preferred core module for a connection to an egress module;

FIG. 9 is a schematic diagram of data structures used to control the transfer of data blocks from an ingress module to core modules of a high capacity WDM-TDM packet switch in accordance with the invention.

It should be noted that throughout the appended drawings, like features are identified by like reference numerals.

DETAILED DESCRIPTION OF THE PREFERRED EMBODIMENT

Figure 1:
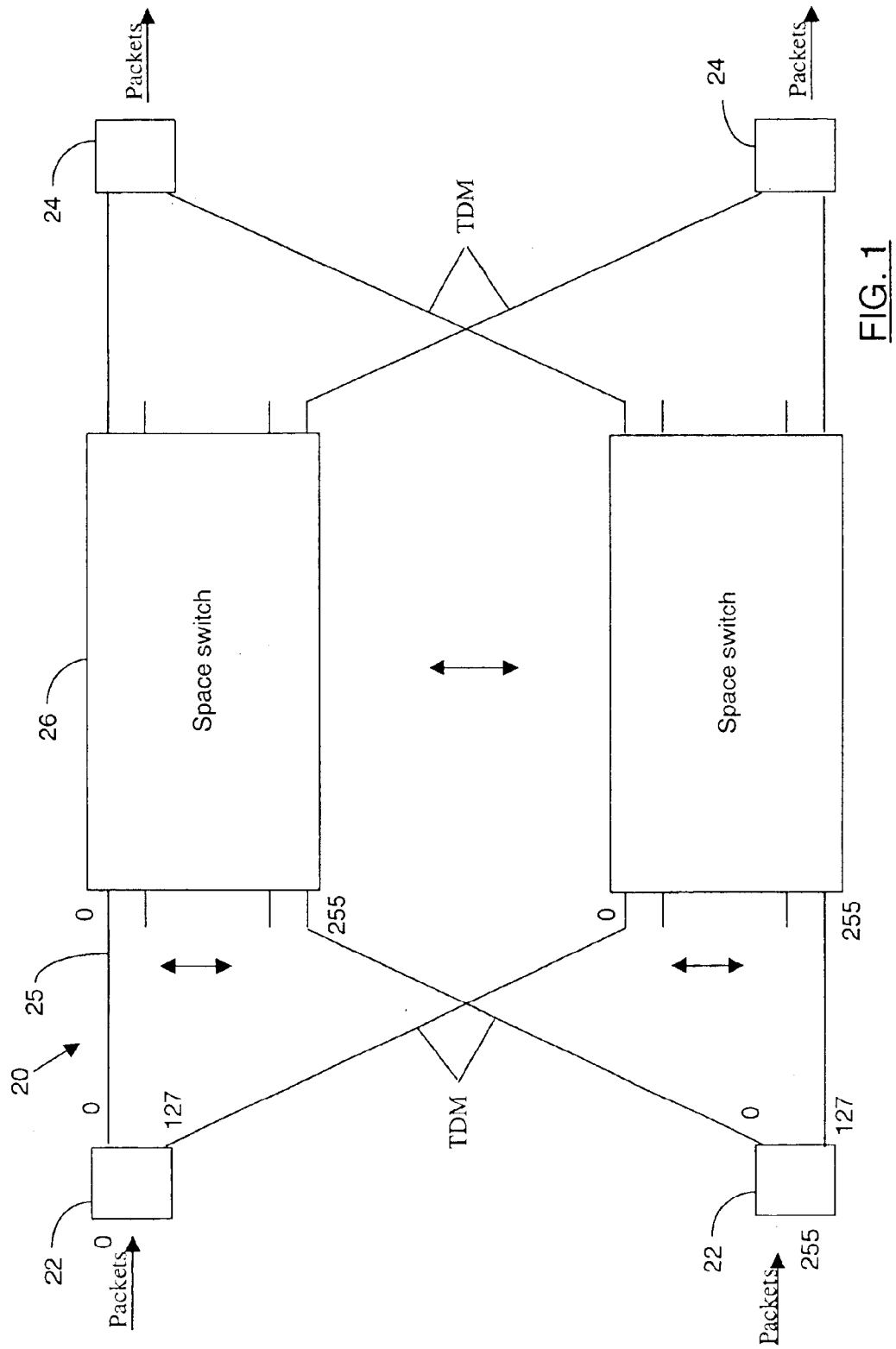
FIG. 1 is a schematic diagram of a high capacity WDM-TDM packet switch in accordance with the invention having a centralized core.

FIG. 1 is a schematic diagram of a high-capacity WDM-TDM packet switch in accordance with the invention, generally indicated by reference 20. The packet switch 20 includes a plurality of edge modules 22, 24 shown for clarity of illustration in an "unfolded" configuration. In the unfolded configuration shown in FIG. 1, ingress edge modules 22 and egress edge modules 24 are separate switching modules constructed, for example, as described in Applicant's copending patent application Ser. No. 09/244,824 which was filed Feb. 4, 1999 and entitled RATE-CONTROLLED MULTI-CLASS HIGH-CAPACITY PACKET SWITCH, the specification of which is incorporated herein by reference. In a folded switch configuration, the ingress edge modules 22 and the egress edge modules 24 are combined into integrated switch modules of one ingress module and one egress module each, each integrated module having as many data ports as a sum of the data ports of the ingress edge module 22 and the egress edge module 24.

Located between the edge module pairs 22, 24 are a plurality of space switches 26 which serve as centralized core modules for the WDM-TDM packet switch 20. For the sake of scalability and switching speed, the space switches 26 are preferably electronic space switches, although optical space switches could be used and may become preferred when optical switching speeds improve. The space switches 26 are arranged in parallel and, as will be described below, are preferably distributed in collocated groups. The number of edge modules 22, 24 and the number of space switches 26 included in the WDM-TDM packet switch 20 are dependent on the switching capacity required. In the example shown in FIG. 1, there are 256 (numbered as 0–255) ingress edge modules 22 and 256 (numbered as 0–255) egress edge modules 24. Each edge module 22 has egress ports to support 128 channels. In a typical WDM multiplexer, 16 wavelengths are supported on a link. Each wavelength constitutes a channel. Consequently, the 128 channels can be supported by eight optical fibers, as will be explained below with reference to FIG. 3.

In order to ensure that any edge module 22 is enabled to send all of its payload traffic to any edge module 24, if so desired, each space switch 26 preferably supports one input channel for each module 22 and one output channel for each module 24. Therefore, in the example shown in FIG. 1, each space switch preferably supports 256 input channels and 256 output channels. The number of space switches 26 is preferably equal to the number of inner channels supported by each edge module 22, 24. (The inner channels are the channels connecting an ingress edge module to the core modules, or the core modules to the egress edge modules.) In the example shown in FIG. 1, there are preferably 128 space switches 26, the number of space switches being equal to the number of inner channels from each ingress module 22.

Figure 2:
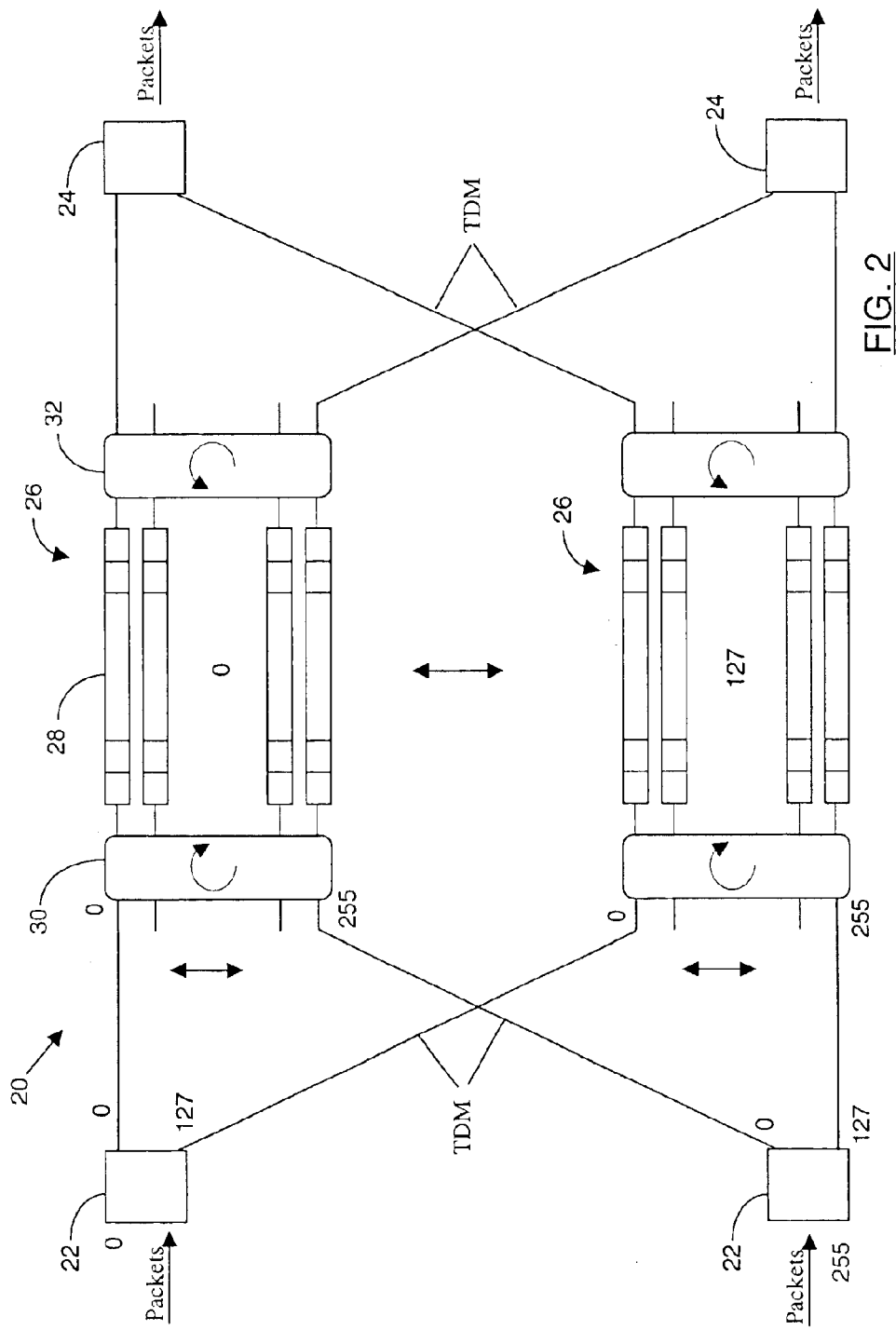
FIG. 2 is a schematic diagram of the high capacity WDM-TDM packet switch shown in FIG. 1 wherein the space switches in the core are single-stage rotator switches.

FIG. 2 is a schematic diagram of a preferred embodiment of the WDM-TDM packet switch shown in FIG. 1. In accordance with a preferred embodiment, each of the space switches 26 is a single-stage rotator-based switch. In the rotator-based switch architecture, a space switch core is implemented as a bank of independent memories 28 that connect to the edge modules 22 of the switch through an ingress rotator 30. Traffic is transferred to the egress edge modules 24 of the switch 20 through an egress rotator 32. The two rotators 30, 32 are synchronized. A detailed description of the rotator switch architecture is provided in U.S. Pat. No. 5,745,486 that issued to Beshai et al. on Apr. 28, 1998, the specification of which is incorporated herein by reference. In other respects, the switch architecture shown in FIG. 2 is identical to that shown in FIG. 1.

In the rotator switches 26, each bank of independent memories 28 is divided into a plurality of memory sections.

Each memory is preferably 128 bytes wide. Each memory is divided into a number of partitions, the number of partitions being equal to the number of egress edge module 24. The size of the memory portion governs a size of data block switched by the channel switching core. The size of the data block is a matter of design choice.

Partitioning the Core

Figure 3:
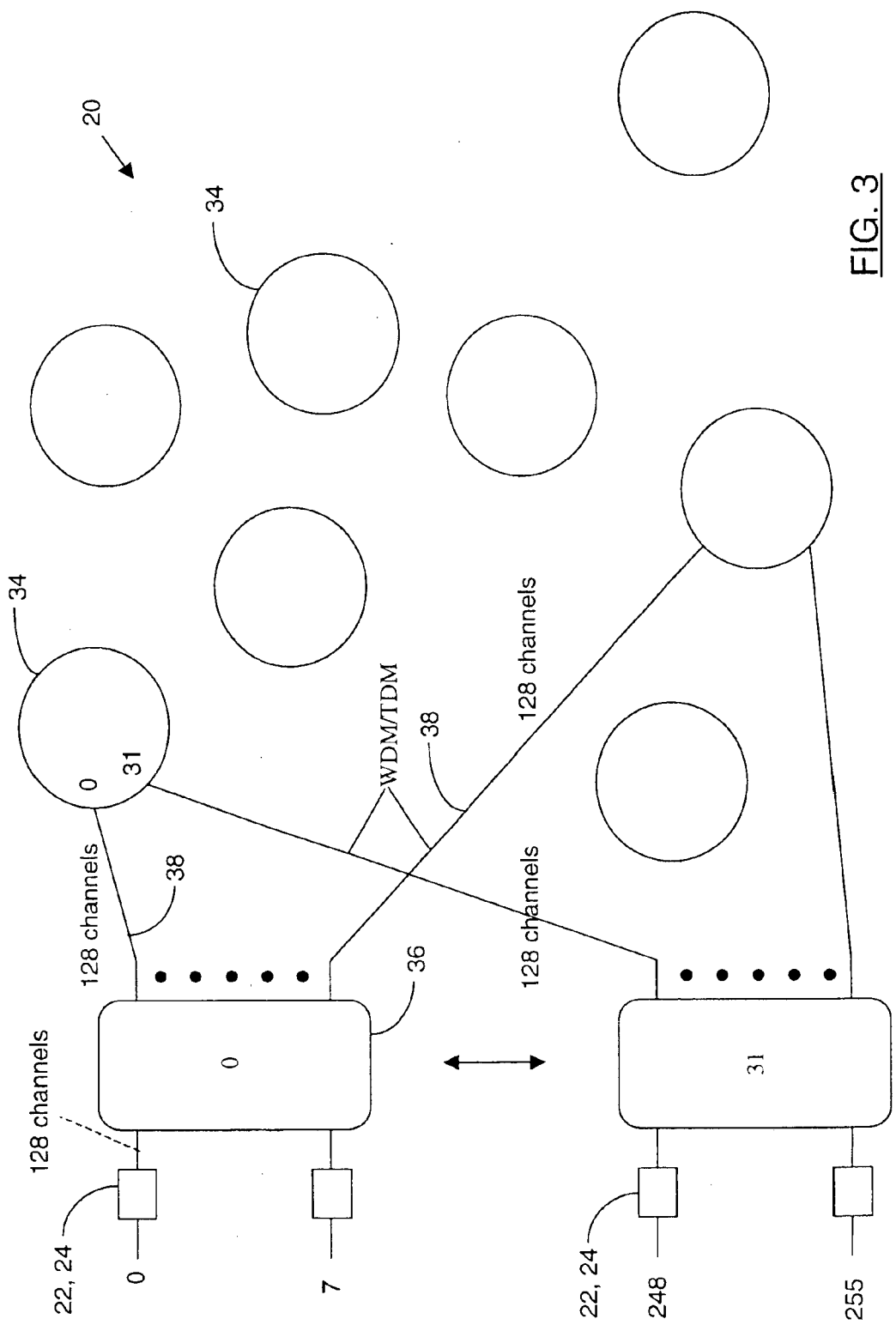
FIG. 3 is a schematic diagram of a high capacity WDM-TDM packet switch in accordance with the invention with a distributed core.

The channel switching core is preferably partitioned into core modules and distributed for two principal reasons: economics and security. FIG. 3 is a schematic diagram of a preferred embodiment of a distributed WDM-TDM packet switch in accordance with the invention. A plurality of core modules 34 are geographically distributed. A plurality of cross-connectors 36, which may be, for example, optical switches of high switching latency, connect a plurality of ingress and egress edge modules 22, 24 to the core modules 34. The cross-connectors 36 switch channels incoming from subtending edge modules to appropriate core modules. This enables the switch configuration to match anticipated traffic patterns. The core modules 34 preferably include equal numbers of rotator switches. A WDM-TDM packet switch 20 of a size shown in FIGS. 1 and 2, with eight core modules 34, includes 16 rotator switches 26 in each core module 34 when geographically distributed as shown in FIG. 3. If the ingress and egress edge modules 22, 24 are grouped in clusters of eight per cross-connector 36, then 32 cross-connectors are required to connect the ingress and egress edge modules 22, 24 to the core modules 34. The clustering of the ingress and egress edge modules 22, 24 and the number of cross-connectors 36 used in any given installation is dependent on network design principles well understood in the art and does not require further explanation. In any distributed deployment of the WDM-TDM packet switches, it is preferred that each ingress and egress edge module 22, 24 be connected to each space switch 26 of each core module 34 by at least one channel. The switch may be partitioned and distributed as desired with the exception that one ingress and egress edge module 22, 24 is preferably collocated with each core module 34 and serves as a controller or hosts a controller, for the core module, as will be explained below in more detail.

Figure 4:
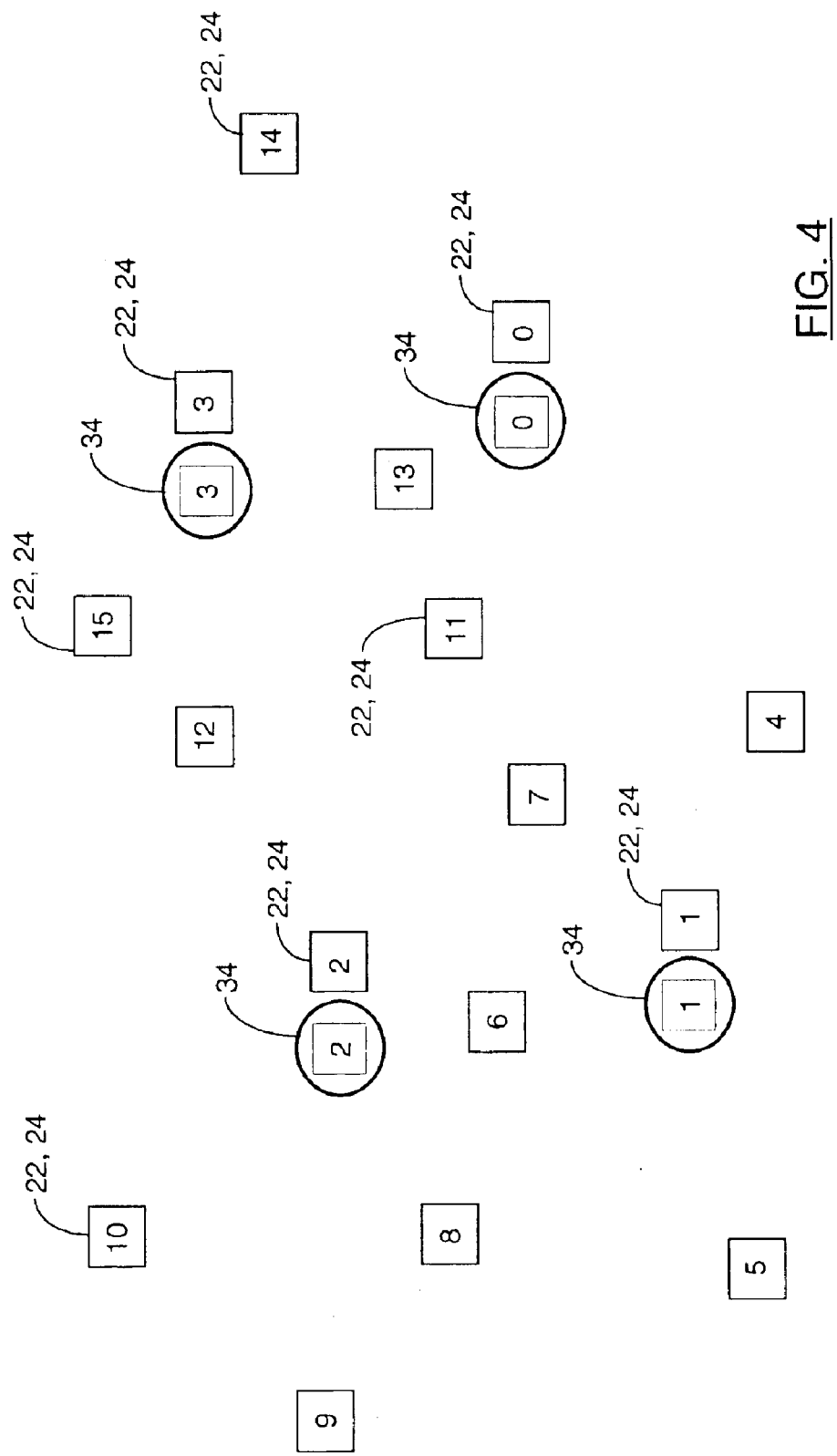
FIG. 4 is a schematic diagram of a high capacity WDM-TDM packet switch in accordance with the invention showing an exemplary distribution of the core modules and edge modules.

FIG. 4 shows an exemplary distribution of a WDM-TDM packet switch 20 in accordance with the invention, to illustrate a hypothetical geographical distribution of the switch. Cross-connectors 36 and optical links 38 are not shown in FIG. 4 for the sake of clarity. In this example, 16 ingress and egress edge modules 22, 24 numbered 0–15 and four core modules 34 numbered 0–3 are potentially distributed over a large geographical area. As explained above, an ingress edge module 22 is collocated with each core module 34. In this example, ingress edge modules-0 to 3 are collated with corresponding core modules-0 to 3. The space switches 26 require controllers to perform scheduling allocations and other functions which are described below in more detail. The ingress edge modules 22 include high-speed processors which are capable of performing control functions, or hosting control functions, for the core modules 34. Consequently, an ingress edge module 22, 24 is preferably collocated with each core module 34. The processor of the ingress edge module 22 that is collocated with a core module need not, however, perform the control functions of the core module 34. Rather, it may host, at one of its ports, a processor to perform the control functions of the core module 34. The collocation is also important to enable time coordination in the distributed WDM-TDM packet switch 20, as explained below.

Time Coordination in the Distributed WDM-TDM Packet Switch

Time coordination is required between ingress edge modules 22 and core modules 34 if the WDM-TDM packet switch 20 is geographically distributed. Time coordination is necessary because of propagation delays between ingress edge modules 22 and the core modules 34. Time coordination is accomplished using a method described in Applicant's above-referenced copending patent application filed Apr. 4, 1999. In accordance with that method, time coordination is accomplished using an exchange of timing packets between the ingress edge modules 22 and the respective edge module controller associated with core modules 34. At predetermined intervals, each ingress edge module 22 is programmed to send a timing packet to the ingress edge module 22 that serves as a controller for the associated core module 34. For example, ingress edge module-9 (FIG. 4) at a predetermined interval sends a timing packet to ingress edge module-3 associated with core module-3. On receipt of the timing packet, the ingress edge module-3, which serves as a controller for the core module-3, stamps the packet with a time stamp that indicates its local time. At some convenient time prior to the next predetermined interval, the time-stamped packet is returned to the edge module-9. The edge module-9, and each of the other ingress edge modules-0 to 15, maintains an array of M reconfiguration timing circuits where M equals the number of core modules 34. The core modules 34 operate independently and reconfigure independently, as will be described below. Consequently, each ingress edge module 22 must maintain a separate reconfiguration timing circuit coordinated with a local time of an ingress edge module 22 collocated with each core module 34. Without timing coordination, guard times for reconfiguration of the core modules 34 would have to be too long due to the propagation delays between the geographically distributed ingress edge modules 22 and the core modules 34.

For example, in the configuration of the WDM-TDM packet switch 20 shown in FIG. 4, each ingress edge module 22 must maintain an array of four reconfiguration timing circuits respectively coordinated with the local times of ingress edge modules-0 to 3 collocated with the respective core modules 34. As explained above, in order to maintain time coordination, the ingress edge module-9, at regular predetermined intervals, sends a timing packet to the ingress edge module-0. The timing packet is sent over a communications time slot and received on an ingress port of the ingress edge module-0. The ingress port, on receipt of the timing packet, time stamps the packet with the time from its local time (timing circuit 0) and queues the timing packet for return to the edge module-9. At some convenient later time before the start of the next timing interval, the timing packet is returned to the ingress edge module-9. On receipt of the timing packet at ingress edge module-9, the ingress edge module-9 uses the time at which the packet was received at ingress edge module-0 (time stamp) in order to coordinate its reconfiguration timing circuit 0 with the local time of ingress edge module-0. Several methods for timing coordination are explained in detail in Applicant's copending patent application Ser. No. 09/286,431 filed Apr. 6, 1999.

Packet Transfer Through the WDM-TDM Packet Switch

Ingress and egress edge modules 22, 24 of the WDM-TDM packet switch 20 operate in packet switching mode. The edge modules 22, 24 are adapted to switch variable sized packets and transfer the packets to subtending sinks in the format in which the packets were received. Switching in the core modules 34 is accomplished in circuit switching mode. The core modules 34 are completely unaware of the content switched and simply switch data blocks. In order to improve resource allocation granularity, the WDM-TDM packet switch 20 switches in both wave division multiplexing (WDM) and time division multiplexing (TDM) modes. Each link 38 (FIG. 3) interconnecting the switched edge modules 22, 24 and the core modules 34 is preferably an optical link carrying WDM data on a number of channels, each channel being one wavelength in the WDM optical link 38. Each channel is further divided into a plurality of discrete time slots, hereinafter referred to simply as "slots". The number of slots in a channel is a matter of design choice. In a preferred embodiment, each channel is divided into 16 time slots. Consequently, the smallest assignable increment of bandwidth is $\frac{1}{16}^{th}$ of the channel capacity. For a 10 gigabit per second (10 Gb/s) channel, the smallest assignable capacity allocation is about 625 megabits per second (625 Mb/s). Connections requiring more capacity are allocated multiple slots, as required.

Admission Control

The capacity requirement for each connection established through the WDM-TDM packet switch 20 is c: determined either by a specification received from a subtending source or, preferably, by automated traffic measuring mechanisms based on traffic monitoring and inference. If automated measurement is used, the capacity requirements are expressed as a number of slots. Regardless of the method used to estimate the capacity requirements, it is the responsibility of the ingress edge modules 22 to quantify the capacity requirements for its traffic load. It is also the responsibility of the ingress edge modules 22 to select a route for each admission request. Route selection is accomplished using connection tables provided by a Network Management System (not illustrated) which provides a table of preferred connecting core modules between each ingress edge module and each egress edge module.

Admission control may be implemented in a number of ways that are well known in the art, but the concentration of responsibility is at the edge and any ingress edge module 22 receiving an admission request first determines whether free capacity is available on any of the preferred routes through a core module defined in its connection table prior to acceptance.

Scheduling at the Edge

At any given time, each ingress edge module 22 has an allocated capacity to each egress edge module 24 expressed as a number of slots. The number of allocated slots depends on a capacity allocation, which may be zero for certain ingress/egress module pairs. The allocated capacities may be modified at regular reconfiguration intervals which are independently controlled by the controllers of the distributed core modules 34. An ingress edge module 22 accepts new connections based on its current capacity allocation to each egress edge module 24. The controller of each ingress edge module 22 also monitors its ingress queues, which are sorted by egress edge module, as described above, to determine whether a change in capacity allocation is warranted. It is the responsibility of each ingress edge module 22 to determine when slots should be allocated and when slots should be released. However, it is the controllers at the core modules 34 that determine whether a bandwidth allocation request can be granted. Bandwidth release requests are always accepted by the controllers of the core modules 34. The re-allocation of bandwidth and the reconfiguration of the core modules 34 is explained below in more detail.

Each ingress edge module 22 determines its capacity requirements and communicates those requirements to the controllers of the respective core modules 34. On receipt of a capacity requirement, a controller of a core module 34 attempts to satisfy the requirement using a rate matching process. The controller of a core module 34 computes a scheduling matrix based on the capacity requirements reported by each ingress edge module 22, as will be explained below, and returns relevant portions of the scheduling matrix to each ingress edge module 24 prior to a reconfiguration of the core module 34. At reconfiguration, three functions are implemented. Those functions are: a) releases, which return unused slots to a resource pool; b) capacity increases which allocate new slots to ingress edge modules 22 requiring it; and c) new capacity allocations, in which the slot allocation for an ingress edge module 22 is increased from zero.

Capacity Scheduling

Figure 5:
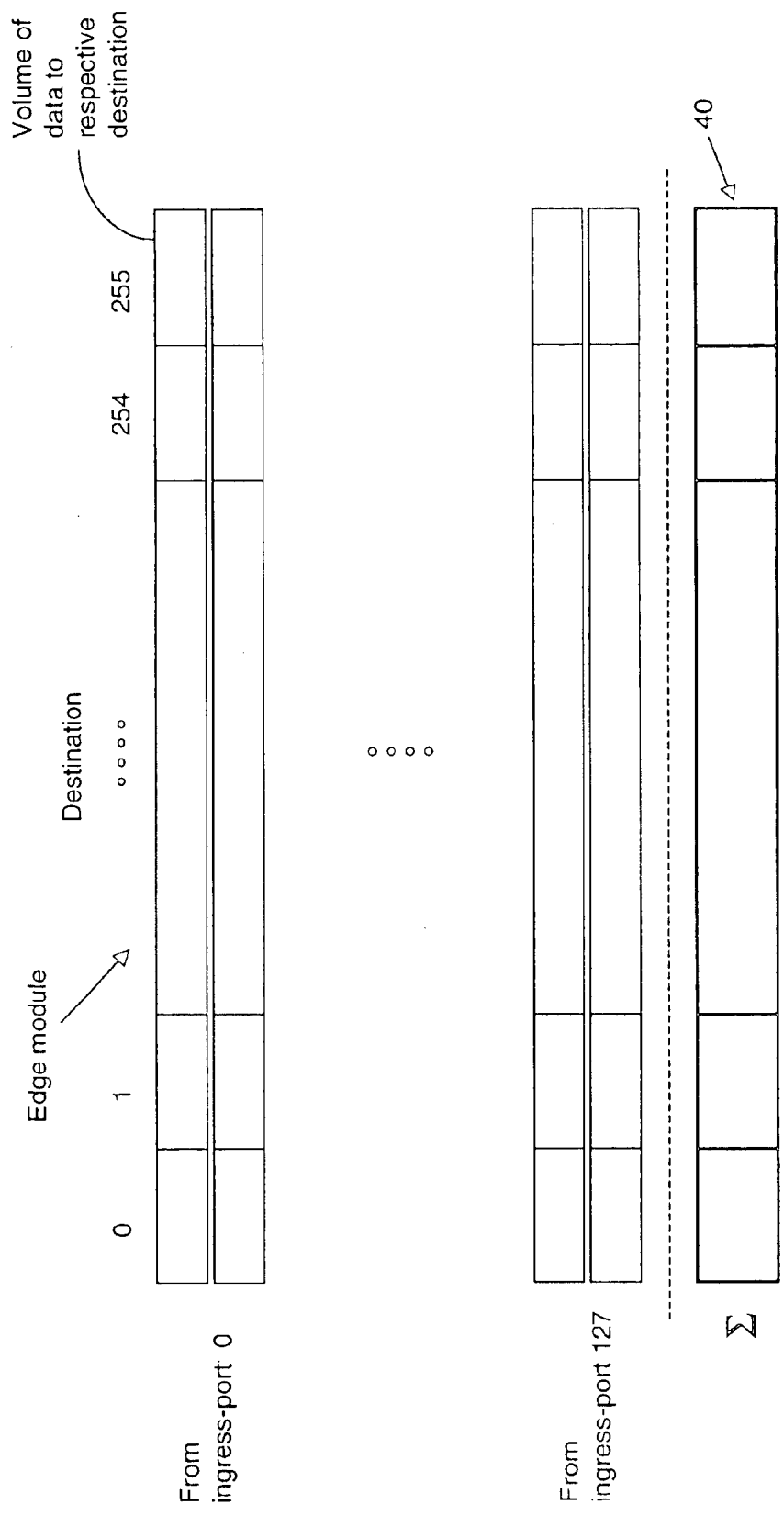
FIG. 5 is a schematic diagram of a data structure used in each edge module to facilitate a process of computing capacity-request vectors in the edge modules.

As described above, the ingress edge modules 22 are responsible for managing their capacity requirements. Consequently, each edge module computes a capacity requirement vector at predetermined intervals such that the capacity requirement is reported to each core module 34 at least once between successive core reconfigurations. FIG. 5 illustrates the computation of the capacity requirement vector. As shown in FIG. 5, an ingress edge module 22 constructs a matrix of x rows and y columns, where x is the number of ingress ports and y is the number of egress modules in the switch configuration. In the example shown in FIGS. 1, 2, and 3, the number of inner channels of each edge module is 128 and number of ingress edge modules 22 is 256. A number representative of an actual occupancy in the egress buffers, or a number resulting from a traffic prediction algorithm, is inserted in each cell of the matrix shown in FIG. 5. A capacity requirement sum 40 provides a summation for each egress edge module 24 of the total capacity requirement. The total capacity requirement is then subdivided into M capacity requirement vectors, where M is the number of core modules 34 and the respective capacity requirement vectors are distributed to the respective core modules to communicate the capacity requirements. A zero in a capacity requirement vector indicates that any capacity previously allocated to the ingress core module 22 is to be released.

In order for an ingress edge module 22 to intelligently request a capacity increase, it must follow a governing procedure. As described above, each ingress edge module 22 is provided with a table of preferred connections to each egress edge module 24. FIG. 6 shows how the table of preferred connections through the switch is used in the bandwidth allocation request process. A preferred connection table 42 is provided to edge module-7 in the network shown in FIG. 4. The preferred connection table 42 provides the edge module-7 with the core modules through which connections can be made with egress edge modules, the core module numbers being listed in a preferred order from top to bottom. Each entry 44 in the preferred connection table 42 is a core module identification number. Therefore, if ingress edge module-7 needs to send packets to egress edge module-0, the preferred core module for the connection is core module-0. The other core modules that may be used for the connection are, in descending order of preference, 3, 1 and 2. Likewise, if edge module-7 needs to send packets to edge module-15, the preferred core module is core module-3, and the alternate core modules, in descending preference, are 2, 0 and 1.

As shown in FIG. 6, the preferred connection table 42 is used in each edge module to facilitate the process of requesting capacity allocations from the respective core modules 34. The array 40 of the capacity summary computed as described above, has 16 entries, one entry for traffic destined to each egress edge module. The array is matched with the preferred connection table 42, which has 16 columns and four rows, as explained above. The array 40 indicates the number of slots required to accommodate traffic from the edge module-7 to the 15 other edge modules in the network shown in FIG. 4. These data structures are used to construct the capacity request vectors described above, which are sent to the respective core modules 34. As will be explained below in more detail, reconfiguration of the core modules is preferably staggered so that two core modules do not reconfigure at the same time. Consequently, there is a staggered reconfiguration of the core modules 34. For each capacity request vector sent by an ingress edge module 22, a first set of capacity request vectors is preferably constructed using the preferred connections listed in the first row of the preferred connection table 42. If a capacity request denial is received back from a core module, an updated capacity request vector is sent to a second choice module. In planning capacity allocations prior to reconfiguration, a core module preferably uses the last received allocation request vector until processing has advanced to a point that any new capacity request vectors cannot be met. Consequently, for example, the capacity request vector sent to core module-0 would request five slots for a connection to egress edge module-0, seven slots for a connection to edge module-11, seven slots for a connection to edge module-13, and ten slots for a connection to edge module-14. If core module-0 denied any one of the capacity requests, an updated capacity request vector would be sent to the next preferred core module shown in the preferred connection table 42.

Figure 7:
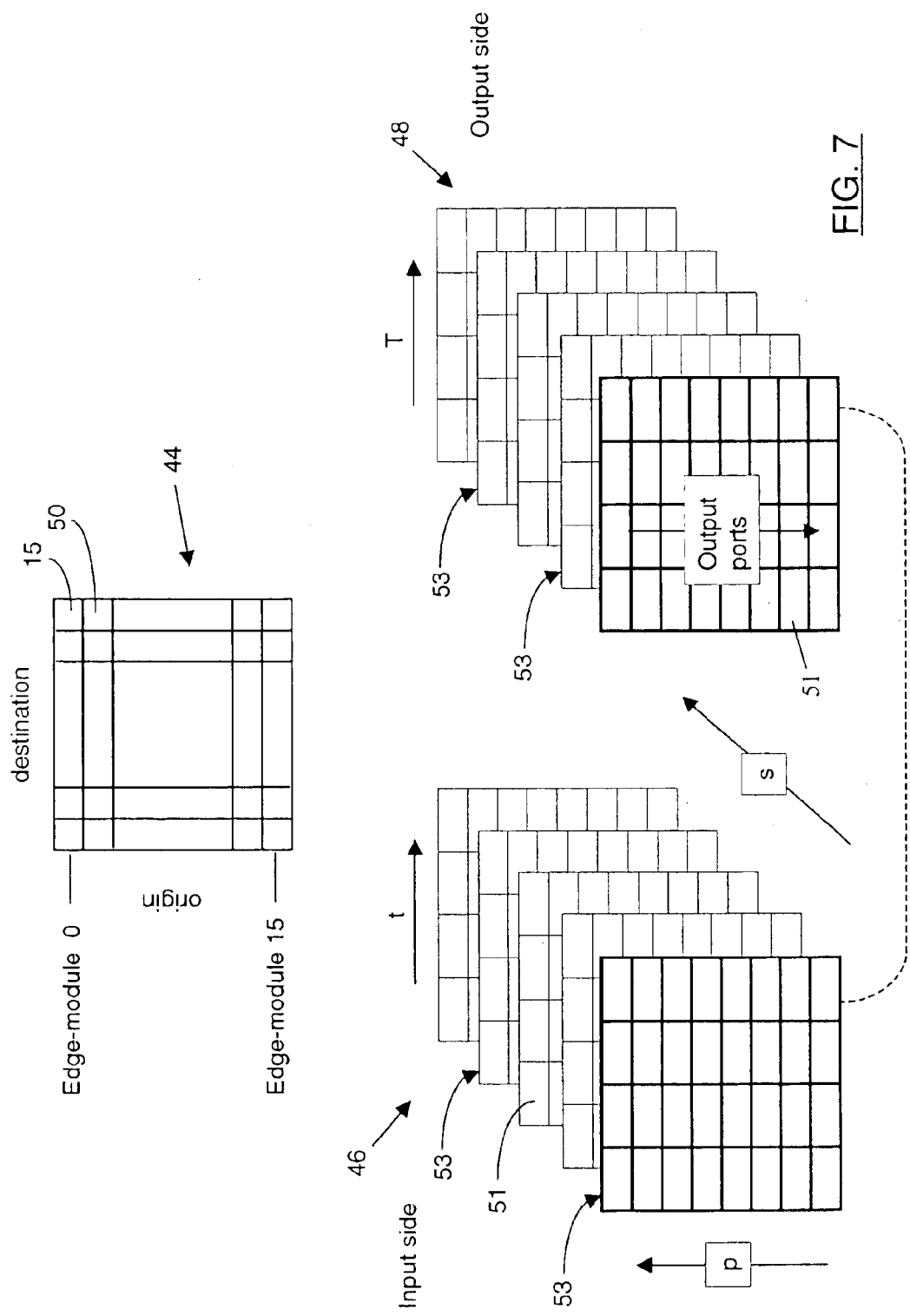
FIG. 7 is a schematic diagram of data structures used in each core module for capacity scheduling using capacity request vectors received from the edge modules.

FIG. 7 illustrates a scheduling function performed by each of the controllers for the respective core modules 34. Each controller for the respective core modules 34 receives capacity request vectors from the ingress edge modules 22. The capacity request vectors received from each ingress edge module 22 is expressed in terms of the number of slots that each ingress edge module requires to accommodate its traffic switched through the given core module 34. The controller of each core module 34 assembles the capacity request vectors in a capacity-request matrix 44 which includes N rows and N columns where N equals the number of ingress edge modules. In the example network shown in FIG. 4, the capacity-request matrix 44 constructed by the controller of each core module 34 would be a 16×16 matrix (256×256 matrix for the network shown in FIG. 3).

The capacity-request matrix 44 sent to a core module 34 is normally a sparse matrix with a majority of null entries since the capacity demand is split among eight core modules. The controller for a core module attempts to schedule the capacity requested by each ingress edge module 22 using data structures generally indicated by references 46 and 48. Each of the data structures 46, 48 is a three-dimensional matrix having a first space dimensions, which represents the respective space switches associated with the core module 34; a second space dimension p, which represents the space switch ports; and a time dimension t, which represents the slots in a slotted frame. Thus, an entry in data structure 46 is represented as $\{s,p,t\}$. The seed dimension p may represent an input channel, if associated with the data structure 46, or an output channel if associated with the data structure 48. If the number of slots T per fire is 16, for example, then in the configuration of FIG. 1, which shows a centralized core, the size of the three-dimensional structure 46 is 128×256×16. In the distributed core shown in FIG. 3, each core module uses a three-dimensional structure 46 of size 16×256×16.

When the connections through a core module 34 are reconfigured, the core controller may either reschedule the entire capacity of the respective core module 34 or schedule capacity changes by simply perturbing a current schedule. If the entire capacity of the core module is reconfigured, each ingress edge module 22 must communicate a complete capacity request vector to the core module while, in the latter case, each ingress edge module 22 need only report capacity request changes, whether positive or negative, to a respective core controller. A negative change represents capacity release while a positive change indicates a request for additional capacity. The incremental change method reduces the number of steps required to prepare for reconfiguration.

The capacity scheduling done by the controller for a core module 34 can be implemented by simply processing the non-zero entries in the capacity-request matrix 44 one at a time. A non-zero entry 50 in the capacity-request matrix 44 represents a number of required slots for a respective edge module pair. A three dimensional data structure 46 indicates free input slots at a core module, and data structure 48 shows the free slots at output ports of the core module 34. The three dimensional data structures 46, 48, initialized with null entries, are then examined to determine if there are sufficient matching slots to satisfy the capacity request. Each cell 51 in each data structures 46, 48 represents one slot. A slot in structure 46 and a slot in structure 48 are matching slots if each is unassigned and if both have the same first space dimensions (s) and time dimension (t). Thus, slot $\{s,j,t\}$ in data structure 46 and slot $\{s,k,t\}$ in data structure 48 are matching if both are free, regardless of the values of j and k.

A capacity request is rejected by a core module if sufficient matching slots cannot be found. In order to reduce the incidence of mismatch, the matching process should always start from a selected space switch at a selected time slot and follow the same search path for each capacity request. For example, the matching process may start from space switch 0 at time slot 0 and then proceed by increasing the time slot, s, from 0 to T, where T is the number of time slots per timeframe. It then continues to the next time-port plane 53 until the 16 planes (in this example) are exhausted or the capacity is successfully allocated, whichever takes place first. The result produced by this packing search, which is well known in the art, is an occupancy pattern shown in FIG. 8.

Figure 8:
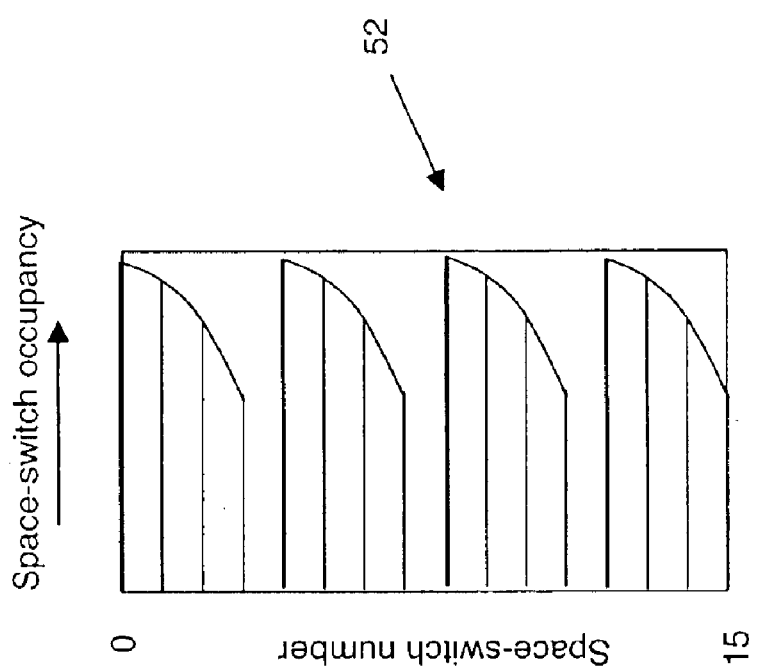
FIG. 8 is a schematic diagram illustrating space switch occupancy in a four core-module distributed switch in which a matching method employing a packing-search discipline is used.

FIG. 8 shows a typical space switch occupancy for each of the core modules 34. Each core module 34 includes four space switches in this example. Observing any of the core modules, the occupancy of the space switch at which the matching search always starts is higher than the occupancy of the second space switch in the search path, etc. This decreasing occupancy pattern is known to provide a superior matching performance over methods that tend to equalize the occupancy, such as a round-robin or random search.

Packet Transfer from the Edge Modules to the Core

As a result of the scheduling process described above, each core module, prior to reconfiguration, returns to each ingress edge module 22 a schedule vector which is used to populate a schedule matrix 54 partially shown in FIG. 9. The schedule matrix 54 is a matrix containing T rows (where T=16 in this example) and N columns where N equals the number of ingress edge modules 22. The 16 rows, only four of which are illustrated, represent the 16 slots in a frame. The non-blank entries 56 in the schedule matrix represent channel identifiers of the egress channels of an egress edge module 22. The edge module is enabled to transfer one data block to a core module 34 for each valid entry in the schedule matrix 54. For example, in the first row (slot 0) of the matrix 54 shown in FIG. 9, the ingress edge module 22 can transfer a data block through port 16 to egress edge module 254. In time slot 2, the edge module can transfer one data block through channel 97 to edge module-1, and one data block through channel 22 to edge module-14. The ingress edge module 22 has no knowledge of the core module to which the data block is to be transferred and requires none.

The size of a data block is a matter of design choice, but in the rotator-based core modules, the size of a data block is related to the structure of middle memories 28 (FIG. 2). In general, a data block is preferably 1 kilobits (Kb) to about 4 Kb. In order for data blocks to be transferred from the ingress queues to the appropriate egress channel, an array 58 stores pointers to packets sorted according to destination module. The pointers 58 are dynamically updated each time a data block is transferred from the ingress queues to an egress channel.

In actual implementations, it is preferable to maintain two matrices 54, one in current use and one in update mode. Each time a core reconfiguration takes place, the matrix in use is swapped for a current matrix. The unused copy of the matrix is available for update. Rows in the matrix 54 are executed sequentially one per slot until a next core module reconfiguration occurs. After core module reconfiguration, processing continues at the next slot.

The invention thereby provides a very high-speed packet switch capable of wide geographical distribution and edge-to-edge total switching capacity that is scalable to about 320 Tera bits per second (Tbs) using available electronic and optical components. The control is principally edge-based and the core modules 34 operate independently so that if one core module fails, the balance of the switch continues to operate and traffic is rerouted through the remaining available core modules. Normal recovery techniques well known in the art may be used to ensure continuous operation in the event of component failure.

The embodiments of the invention described above are intended to be exemplary only. The scope of the invention is therefore intended to be limited solely by the scope of the appended claims.

I claim:

1. A switch comprising:
   a plurality of core modules;
   a plurality of core controllers operating concurrently and independently, one core controller for each of said core modules;
   a plurality of egress modules each having a link from each of said core modules; and
   a plurality of ingress modules each having;
      an ingress controller;
      a plurality of ingress ports each having an ingress buffer; and
      a link to each of said core modules;
   wherein said ingress controller is operable to
      sort packets arriving at said ingress buffer into ingress queues, each ingress queue corresponding to one of said egress modules;
      issue packet-transfer requires each specifying an egress module;
      distribute the packet-transfer requires among said plurality of core modules for scheduling so that each of said core controllers receives a portion of said transfer requests; and
      periodically determine ingress-queue occupying for each respective egress module and send a capacity-request vector to a selected one of the core controllers, the capacity-request vector including capacity-allocation requests for connections to a subset of the egress modules.

2. The switch as claimed in claim 1 wherein each of said core modules computes a schedule in response to receiving a capacity-request vector, the schedule specifying, for each capacity request, time slots in a predefined time frame.

3. The switch as claimed in claim 2 wherein each core module comprises a single-stage space switch.

4. The switch as claimed in claim 3 wherein said space switch is a rotator space switch comprising an input rotator, a plurality of memory devices, and an output rotator.

5. The switch as claimed in claim 2 wherein the core modules, the ingress modules, and the egress modules are spatially distributed.

6. The switch as claimed in claim 5 wherein each core module comprises a number $S \geq 1$ of single-stage space switches, each space switch having a plurality of input ports each connecting to an ingress module and a plurality of output ports each connecting to an egress module.

7. The switch as claimed in claim 6 wherein said single-stage space switch is an optical switch.

8. The switch as claimed in claim 6 wherein each ingress module has a plurality of timing circuits each communicating with a time counter associated with a one of said core modules to realize time coordination between said each ingress module and said one of said core modules.

9. The switch as claimed in claim 6 wherein each link carries a wavelength-division-multiplexed optical signal comprising S wavelength channels and wherein each of said single-stage space switches connects channels of the same wavelength.

10. A method of scheduling performed by a controller of a core module haying at least one link from each of a plurality of ingress modules, said core module comprising a plurality of $S \geq 1$ space switches, each space switch having a plurality of input ports and a plurality of output ports, the method comprising steps of:
   creating a data structure comprising
      a first three dimensional matrix having a space dimension s representing space switches associated with the core module, a space dimension p representing space-switch input ports, and a time dimension r representing rime slots in a slotted time; and
      a second three-dimensional matrix having said space dimension s, a space dimension $\pi$ representing space-switch output ports, and said time dimension t;
   receiving capacity-allocation requests from the ingress modules, each request specifying an input port p, an output port $\pi$ and a number K of time slots per time frame; and
   selecting a space switch s and a time slot t and, if both entries $\{s, p, t\}$ of the first matrix and $\{s, \pi, t\}$ of the second matrix arm free, allocating space-switch s and timeslot t and marling entries $\{s, p, t\}$ and $\{s, \pi, t\}$ as busy.

11. The method as claimed in claim 10 further including a step of repeating said selecting until at most K time slots are allocated.

12. The method as claimed in claim 11, wherein said selecting for each capacity-allocation request considers all time slots in said time frame, then all of said plurality of space switches.

13. The method as claimed in clam 12, further including a step of producing a scheduling matrix that associates each of said input ports with each of said output ports during each of said time slots.

14. The method as claimed in claim 13 wherein said all time slots are considered in a predetermined order.

15. The method as claimed in claim 13 wherein said all of said plurality of switches are considered in a predetermined order.

16. The method as claimed in claim 13 including the further steps of: assembling said capacity-allocation requests into a capacity-request matrix each entry of which containing a requested capacity allocation, and attempting to schedule each entry in the matrix to perform core reconfiguration.

17. The method as claimed in claim 16 including the further step of maintaining at each ingress module two scheduling matrices, one in current use and one in update mode.

18. The method as claimed in claim 17 wherein each dime a core reconfiguration occurs, a scheduling matrix in use is swapped for a current scheduling matrix.

19. The method as claimed in claim 18 wherein an unused copy of the scheduling matrix is available for update after the core reconfiguration.

20. The method as claimed in claim 19 wherein rows in the scheduling matrix are executed sequentially, one per time slot, until a next core module reconfiguration occurs, and, after core module reconfiguration, processing continues at a next time slot.

21. The method as claimed in claim 10 further including a step of terminating a current connection by setting the value of K to zero.

22. A distributed packet switch comprising:
a plurality of channel cross connectors each having a plurality of outer links and a plurality of inner links;
a plurality of core modules each of said core modules comprising a number of space switches;
a plurality of edge modules each including an edge controller and
a plurality of core controllers, one core controller associated with each of said core modules;
wherein
each of said outer links connects to an edge module and includes a first number of A channels in each direction to and from said edge module;
each of said inner links connects to a core module and includes a second number of channels in each direction to and from said core module,
said can modules and said core modules are spatially distributed over a wide geographical area and
each of said edge modules exchanges timing packets with each of said core modules to accomplish time coordination.

23. The distributed packet switch as claimed in claim 22 wherein each of said outer links is a wavelength-division-multiplexed link and each of said inner links is a wavelength vision-multiplexed link.

24. The distributed packet switch as claimed in claim 22 wherein said means includes a timing circuit.

25. The distributed packet switch as claimed in claim 24 wherein each of said core modules has means for time coordination with each of said edge modules.

26. The distributed packet switch as claimed in claim 25 wherein said means includes a timing circuit.

27. The distributed packet switch as claimed in claim 26 wherein at least one of said space switches in each of said core modules operates in a time-division-multiplexed mode.

28. The distributed packet switch as claimed in claim 27 wherein at least two edge modules transmit time-division-multiplexed signals to said at least one of said space switches and adjust their transmission times so that the time-division-multiplexed signals are received at said at least one of said space switches in time alignment.

29. The distributed packet switch as claimed in claim 28 wherein one of said edge modules is collocated with a selected one of said core modules and hosts a controller that serves as the core controller of said one of said core modules.

30. The distributed packet switch as claimed in claim 28 wherein each of said edge modules is adapted to transmit capacity allocation requests to any of said core modules.

31. The distributed packet switch as claimed in claim 30 wherein the core controller associated with said any of said core modules computes a schedule in response to receiving said capacity-allocation requests, the schedule specifying, for each capacity request, time slots in a predefined time frame.

32. The distributed packet switch as claimed in claim 31 wherein at least one of said space switches is an electronic space switch.

33. The distributed packet switch as claimed in claim 31 wherein at least one of said space switches is an optical space switch.

34. The distributed packet switch as claimed in claim 31 wherein at least one of said space switches is an electronic single-stage rotator switch.

35. A packet switch comprising:
a plurality of egress modules, each for transmitting packets to subtending packet sinks
a plurality of ingress modules each ingress module having a plurality of ingress ports and an ingress controller, each of said ingress ports including:
an associated ingress buffer for receiving packets from subtending packet sources; and
means for sorting packets arriving in the ingress buffer into ingress queues each ingress queue corresponding to an egress module from which packets in said each queue are to egress from the switch for delivery to the subtending packet sinks,
a plurality of core modules each connecting to each ingress module and to each egress module and having its own controller for allocating and scheduling data paths of sufficient capacities to accommodate connection requests received from any ingress module to transfer packets to any egress module, said own controller operating independently of and concurrently with controllers of other core modules; and
at least one cross-connector connection a subset of the ingress modules to the core modules,
wherein each ingress module includes means for routing a connection through at least one core module, and wherein said data paths carry data blocks of equal durations.

36. The packet switch as claimed in claim 35 wherein each of said core modules maintains its own time reference.

37. The packet switch as claimed in claim 36 wherein each of said ingress modules times the transmission of its data blocks to arrive at a selected one of said corn modules at a time determined by said selected one of said core modules.

38. The packet switch as claimed in claim 35 wherein each ingress module is further adapted to send capacity-allocation requests to a one of said core modules.

39. The packet switch as claimed in claim 38 wherein each ingress module is further adapted to receive connection schedules from each of said core modules.

40. The packet switch as claimed in claim 38 wherein each of said connections is scheduled for transmission over time-slots of equal duration and each of said connection schedules includes timeslot identifiers for each scheduled connection.

41. The switch as claimed in claim 40 wherein each core module comprises a plurality of single-stage rotator switches, each rotator switch having a number of input ports collectively adapted to accommodate a number of channels at least equal to the number of ingress modules and a number of output ports collectively adapted to accommodate a number of channels at least equal to the number of egress modules, each ingress module having at les one channel to each of the rotator switches, and each egress module having at least one channel from each of the rotator switches.

42. The packet switch as claimed in claim 41 wherein each ingress module is combined with an egress module to form an integrated edge module.

43. The switch as claimed in claim 40 wherein the core modules are co-located at one geographical location.

44. The switch as claimed in claim 40 wherein the core modules, the ingress modules, and the egress modules are spatially distributed.

45. The packet switch as claimed in claim 40 wherein each ingress module has a number of timing circuits at least equal to the number of core modules, each of the timing circuits being time-coordinated with a time counter associated with each of said core modules.

46. The switch as claimed in claim 45 wherein one edge module is co-located with each core module and said one edge module serves as a controller for the core module.

47. The packet switch as claimed in claim 38 wherein each ingress module is further adapted to:
create a vector of pointers to the sorted packets; and
assemble said connection schedules into a scheduling matrix so that a non-blank entry in the scheduling matrix indicates au index of the vector of pointers.

48. The packet switch as claimed in claim 47 wherein said ingress controller receives capacity requirements from subtending sources and determines said capacity-allocation requests.

49. The packet switch as claimed in claim 47 wherein the ingress controller periodically determines a number of packets waiting in the ingress queues for each respective egress module and determines said capacity-allocation requests.

50. A method of switching a packet through a switch comprising a plurality of ingress modules each having at least one ingress port, a plurality of egress modules each having at least one egress port, and a plurality of core modules, wherein each ingress module is coupled to each core module, each core module is coupled to each egress module, the method comprising the steps of:
one of said ingress modules receiving a packet from a subtending traffic source;
said one of said ingress modules sending a connection request to a selected one of the core modules, requesting a connection of a specified capacity to one of said egress modules;
said selected one of the core modules:
determining available capacity:
updating said connection request according to said available capacity; and
returning the connection request to said one of the ingress modules; and
said one of the ingress modules sending the connection request to another of the core modules if said available capacity is less than said specified capacity.

51. The method as claimed in claim 50 wherein said any one of the core modules is selected at random.

52. The method as claimed in claim 50 wherein said any one of the core modules is selected according to a preferred order.

53. The method as claimed in claim 52 wherein said preferred order is specific to said one of the ingress modules and said one of the egress modules.

* * * * *

UNITED STATES PATENT AND TRADEMARK OFFICE
CERTIFICATE OF CORRECTION

PATENT NO. : 6,876,649 B1
DATED : April 5, 2005
INVENTOR(S) : Beshai

It is certified that error appears in the above-identified patent and that said Letters Patent is hereby corrected as shown below:

Column 1,
Line 3, insert:
-- This invention was made with Government support under Technology Investment Agreement F30602-98-2-0194 awarded by the Air Force. The Government has certain rights in this invention. --.

Signed and Sealed this

Sixteenth Day of August, 2005

JON W. DUDAS
*Director of the United States Patent and Trademark Office*